April 25, 1961 R. B. MATTHEWS 2,981,774
TEMPERATURE CONTROL APPARATUS
Filed Feb. 12, 1957
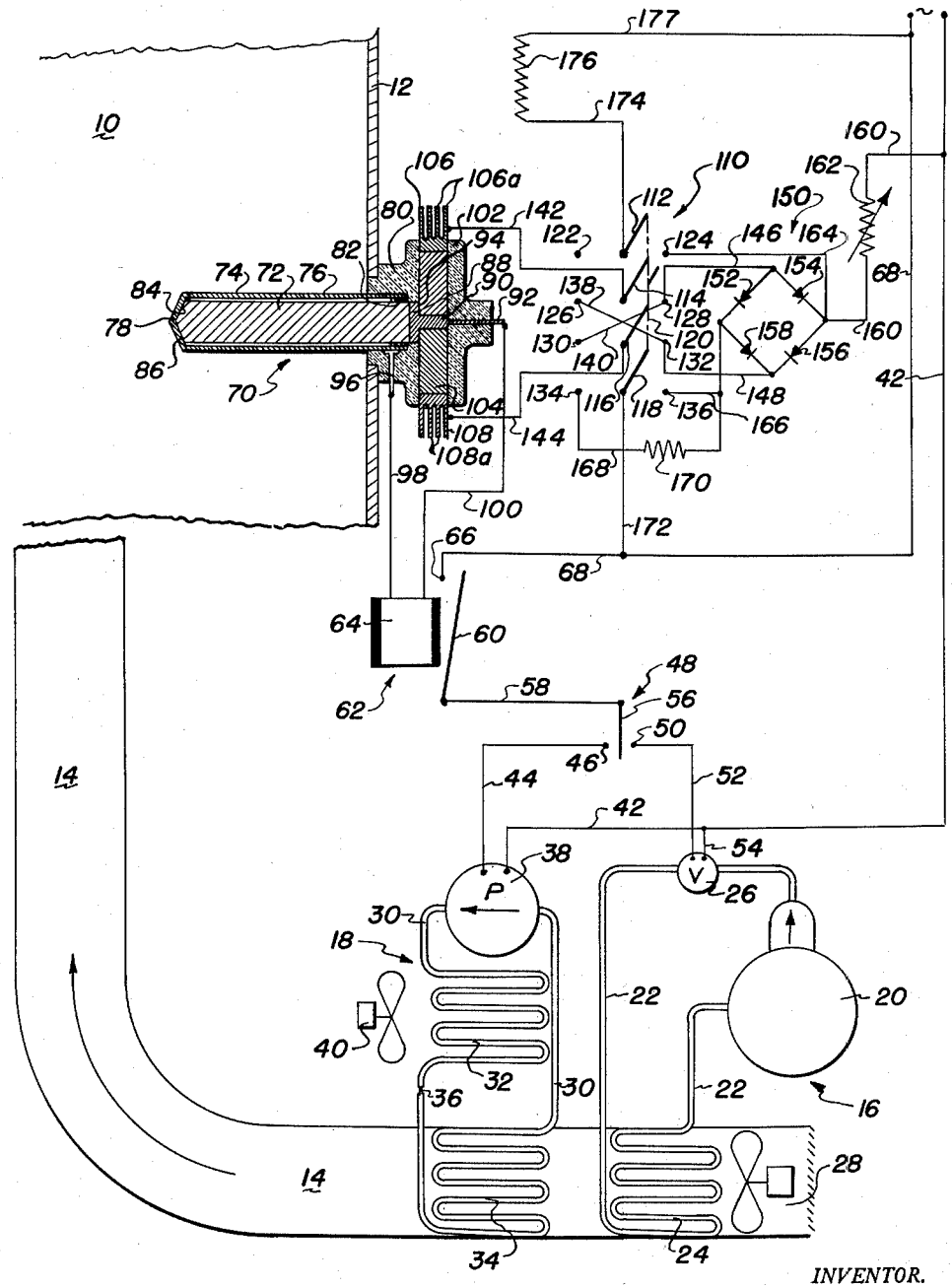
INVENTOR.
Russell B. Matthews
BY
Aegert & Schwalbach
Attys

United States Patent Office 2,981,774
Patented Apr. 25, 1961

2,981,774

TEMPERATURE CONTROL APPARATUS

Russell B. Matthews, Wauwatosa, Wis., assignor, by mesne assignments, to Minnesota Mining and Manufacturing Company, St. Paul, Minn., a corporation of Delaware Filed Feb. 12, 1957, Ser. No. 639,748

6 Claims. (Cl. 136—4)

This invention relates to temperature control apparatus and more particularly to apparatus including thermoelectric generating means for sensing temperature variations.

More specifically, the present invention pertains to temperature control apparatus employing a thermoelectric generator having one of its junctions at a substantially constant temperature whereby temperature variations at the other junction produces a corresponding change in the electrical energy generated by said thermoelectric generator.

Wherefore, it is an object of this invention to provide temperature control apparatus having a thermoelectric generator for sensing temperature variations as above set forth, and wherein a heat pump is employed for maintaining the reference junction at a predetermined temperature.

Another object is to provide temperature control apparatus as characterized above wherein a reversely energizable heat pump is employed for maintaining the reference junction at a high or low temperature in accordance with energization of said pump.

Another object is to provide temperature control apparatus as characterized above wherein the heat pump comprises at least one semi-metallic thermoelement.

Another object of the present invention is to provide temperature control apparatus for apparatus comprising heating and cooling means, said control apparatus including a thermoelectric generator having one thermocouple junction exposed to temperature variations afforded by said heating and cooling means and another thermocouple junction substantially independent thereof, there being a reversely energizable heat pump associated with said last-mentioned thermocouple junction to maintain the temperature thereof higher than said one thermocouple junction during operation of said heating means and lower than said one junction during operation of said cooling means.

Another object is to provide temperature control apparatus as characterized above wherein the thermoelectric generator and heat pump each comprise at least one semi-metallic thermoelement.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawing, in which the single figure is a schematic showing of an embodiment of the present invention, some of the components being shown in section.

Referring to the single figure of the drawings, it shows an enclosure 10 having a side wall 12, and an air duct or conduit 14 for communication with the interior of enclosure 10. Associated with conduit 14 are temperature varying means 16 and 18. Temperature varying means 16 constitutes a heating unit for increasing the temperature of the air within air duct 14 and may comprise a boiler 20 associated with suitable heating apparatus (not shown). Fluid conduit means 22 is provided for circulation of heated water or other fluid from boiler 20, said conduit means 22 being formed as heating coils 24 positioned within air duct 14. An electroresponsive flow control valve 26 is operatively associated with conduit 22 for control of the flow of heated fluid to coils 24. The particular temperature increasing means 16 shown in the drawings and described herein is merely to illustrate the present invention and is not an essential element thereof. Rather, temperature increasing means 16 may take any desired form such as the hot air systems known in the heating art and employing a fluid fuel burner positioned within or associated with conduit 14 to afford heating of the air therewithin. In like manner, the appended claims are not to be restricted to any particular form of temperature varying means but rather are intended to encompass all devices or apparatus which come within their terms.

The temperature varying means 18 constitutes temperature decreasing means for lowering the temperature of the air within air duct 14. Means 18 may take the form of a refrigerating unit, as shown, comprising a fluid conduit 30 filled with fluid refrigerant and formed into coils 32 to provide a heat exchanger portion and coils 34 to provide an evaporator portion. An expansion valve 36 is positioned in conduit 30 between heat exchanger 32 and evaporator 34. Positioned in conduit 30 is a fluid pump or compressor 38 for circulating the fluid refrigerant as is well understood in the art. A fan 40 is disposed adjacent heat exchanger unit 32 and is operable to aid in removing heat from the fluid refrigerant.

A fan 26 is positioned within conduit 14 for forcing or pushing the air within air duct 14 into enclosure 10 for varying the temperature of the air within the latter. A lead wire 42 affords connection of one side of pump 38 with a source of electrical power (not shown), while another lead wire 44 affords connection of the other side of pump 38 with a stationary contact 46 of a manually operable single-pole double-throw switch or circuit controlling device 48. Switch 48 also comprises another stationary contact 50 which is connected to one side of electroresponsive valve 26 by a lead wire 52, the other side of valve 26 being connected to lead wire 42 by a lead wire 54. A movable pole member or electrical contactor 56 of circuit controlling device 48 is connected by means of a lead wire 58 to a movable contactor 60 of an electroresponsive switch 62.

Electroresponsive switch 62 comprises an energizing winding 64 which when energized above a predetermined minimum level of energization affords magnetic attraction of contactor 60 into circuit completing engagement with a stationary contact 66. A lead wire 68 affords connection of stationary contact 66 with one side of the aforementioned source of electrical power (not shown).

Positioned within a suitable opening in the side wall 12 of enclosure 10 is a unitary thermoelectric generator-heat pump 70. The generator portion of structure 70 comprises a pair of thermocouple element means 72 and 74, the latter of which takes the form of an elongated, generally cup-shaped sheath member, preferably of stainless steel. Sheath 74 has a tubular sleeve portion 76 and a tip portion 78. The opposite end of member 74 is telescopically received within a counterbore formed in an insulating mounting member 80 and is sealingly fixed therein. Mounting member 80 is fixed to side wall 12 of enclosure 10 in any desired manner. The thermocouple element means 72 preferably comprises a rod-like or cylindrical ingot of semi-metallic alloy or composition disposed in coaxial spaced relation within the sheath 74. The sheath 74 is formed with a conical inner end wall 84 and the semi-metallic element 72 is formed with a complementary conical end wall 86 which is seated against the end wall 84 there being annular insulating means 82 between sheath 74 and element 72 adjacent mounting member 80 to afford the coaxial relation therebetween. The element means 72 includes a contact electrode 88 affording reference thermojunction means for said generator and having physically joined thereto a stem portion 90 and a terminal portion 92. A terminal member 96 having electrical engagement with sheath 74 is positioned within mounting member 80. A lead wire 98 affords connection of terminal member 96 with one side of energizing winding 64 of electro-responsive circuit controlling device 62, the other side of the latter being connected to terminal portion 92 of contact electrode 88 by means of a lead wire 100.

The heat pump portion of structure 70 comprises two thermocouple element means 102 and 104 in contact with opposite sides of stem portion 90, which stem portion affords thermojunction means for said heat pump. Fixed to thermocouple element means 102 is a heat transfer member 106 formed with fins 106a, while a similar heat transfer member 108 formed with fins 108a is fixed to thermocouple element means 104.

A four-pole double-throw manually operable switch 110 having movable poles or contactors 112, 114, 116 and 118 connected by an insulating member 120, is provided in the energizing circuit for the heat pump. Switch 110 further comprises stationary contacts 122, 124, 126, 128, 130, 132, 134 and 136 for cooperation with the movable poles as will hereinafter appear, there being conducting means 138 affording electrical connection of stationary contacts 126 and 132 and conducting means 140 affording electrical connection of stationary contacts 128 and 130. A lead wire 142 affords connection of heat transfer member 106 with movable contactor 114 while a lead wire 144 affords connection of heat transfer member 108 with contactor 116 of switch 110.

Connected in circuit with stationary contacts 128 and 132 by lead wires 146 and 148, is a rectifier bridge circuit 150 comprising electrical rectifiers 152, 154, 156 and 158. One side of bridge circuit 150 is connected to lead wire 42 by a lead wire 160 having an adjustable current limiting resistor 162, and to stationary contact 124 by a lead wire 164. The other side of bridge circuit 150 is connected to stationary contact 136 by a lead wire 166, there being a lead wire 168 having a temperature responsive resistor or thermistor 170 affording connection of stationary contact 134 to said lead wire 166. A lead wire 172 affords connection of contactor 118 of switch 110 to lead wire 68. Contactor 112 of switch 110 is connected to lead wire 68 by a lead wire 174, a temperature responsive resistor or thermistor 176, and a lead wire 177.

Thermistors 170 and 176 are of the type wherein the electrical resistance varies inversely with variations in temperature thereof, and are intended to be exposed to temperature variations external of enclosure 10, such as the temperature variations which occur outdoors of a building having enclosure 10 as one of its rooms.

The thermocouple element means 72 of the generator portion of structure 70 may be formed of an alloy described in the copending application of Sebastian Karrer, Serial No. 475,540, filed December 15, 1954, now Patent No. 2,811,570, and assigned to the assignee of the present application, said alloys comprising lead and at least one member of the group tellurium, selenium and sulphur. For example, a thermoelectric element of lead-selenium-tellurium composition could include a tellurium-selenium constituent in which the selenium is but a trace. In this case, such constituent would consist of from 35% to 38.05% by weight of the composition, the balance (61.95% to 65% by weight) being lead. At the other extreme, where the tellurium-selenium constituent consists almost entirely of selenium with but a trace of tellurium, such constitutent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

The thermoelectric element 72 may also be formed of an alloy of lead, selenium and sulphur. For example, a thermoelectric element of lead-selenium-sulphur composition would consist of a selenium-sulphur constituent in which the sulphur is but a trace. In this case, such constituent would constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise 12.8% to 13.37% by weight of the final composition, the remainder (from 87.2% to 86.63% by weight) being lead. Between these two extremes, the selenium-sulphur constituent varies linearly with the ratio of selenium to sulphur (expressed in atomic percent) in the selenium-sulphur constituent.

With regard to the aforementioned compositions, it will be observed that in each case there is an excess of lead over and above the amount thereof necessary for satisfying the stoichiometric proportions of the compound formed in the second constituent or constituents, i.e., the tellurium, selenium or sulphur. For example, the composition consisting substantially of lead and selenium can contain up to 10.4% lead by weight of the total composition over and above the 72.41% by weight of lead stoichiometrically necessary for combination with selenium.

The electrical characteristics of the aforementioned semi-metallic alloys, desirable, for example in thermoelectric generator elements, can be markedly and advantageously altered in a reproducible manner by the addition thereto of controlled amounts of matter other than the constituents of the base composition. Such additions may also be denominated "beneficial impurities" as distinguished from undesirable impurities. For convenience, these additions are hereinafter designated "promoters," since they tend to enhance the electrical characteristics desired for the particular application of the base compositions.

The aforedescribed base compositions exhibit negative thermoelectric power and negative conductivity. By addition of certain "promoters," such negative properties may be enhanced, while the polarity of the electrical properties of the base composition may be reversed by the addition of certain other promoters to provide a semi-metallic composition having positive electrical characteristics. The copending application of Robert W. Fritts and Sebastian Karrer, Serial No. 475,488, filed on December 15, 1954, now Patent No. 2,811,571, and assigned to the assignee of the present application, gives a complete description of the beneficial impurities, including both departures from perfect stoichiometry and promoters, which have been found to be effective for improvement of the electric properties of the semi-metallic thermoelectric generator elements when added to the aforementioned base composition in minor amounts. For example, up to a maximum of 6.9% by weight of beneficial impurity, including 3.9% excess lead and 3.0% promoter.

The proportions and ranges of the various constituents aforementioned and particularly the minimum limits of lead constituent in the compositions must be regarded as critical if the composition is to have the electrical and physical properties desired. If the lead content is significantly less than the minimum amount indicated for that particular selenium-tellurium or selenium-sulphur proportion, the polarity of the Seebeck E.M.F. changes and the desired electrical and mechanical properties will not be reproducible. On the other hand, if the lead content of any composition appreciably exceeds the aforementioned maximum limits, the resulting composition is too metallic in nature to afford satisfactory energy conversion efficiencies.

Not only are the proportions and ranges aforedescribed to be considered critical, but so also is the purity. More specifically, the limit of tolerable metallic impurity in non-promoted final compositions has been found to be on the order of 0.01%, and the composition must be substantially oxygen free, if the mechanical and electrical properties desired are to be obtained and are to be reproducible. In the case of promoted compositions, however, the limit of tolerable impurity is 0.001%.

In order to utilize any of the aforementioned base alloys or third element addition promoted compositions in electrical devices, for example, as thermoelectric generator elements, they must necessarily be electrically contacted. The major obstacle in this regard has been the difficulty of making electrical contact with such elements without encountering alloying or solution of the contacting electrode therewith. Such alloying or solution between a thermoelectric element of the aforementioned composition and a contacting electrode causes a change in the composition of said element which generally results in a reduction of the thermoelectric power thereof. Such alloying or solution must therefore be controllably restricted if uniformity of the electrical properties and maximum longevity of the thermoelectric element are to be achieved.

Mechanical and electrical contact between the thermocouple element 74 and the semi-metallic thermocouple element 72 is made over a substantial area by contact between the surfaces 84 and 86. Contact with the opposite end of element 72 is made over a substantial area thereof to the contact electrode 88. The contact electrode provides contact of low thermal and electric resistance, and is chemically stable with respect to the element 72. As more fully described in the copending application of Russell E. Fredrick, Robert W. Fritts, and William V. Huck, Serial No. 475,539, filed December 15, 1954, now Patent No. 2,811,569, iron is especially adapted for use as contact electrode material with lead-tellurium-selenium compositions in that it does not alloy or dissolve in such elements at temperatures below 700° C., which is well above the ordinary upper limit of operating temperatures for elements of lead-tellurium-selenium composition. For a semi-metallic element of any of the compositions aforedescribed, including those comprising lead and sulphur, contact electrodes of carbon are suitable.

Contact electrode 88 may be of either a pressure or bonded type. In the latter case, the element-electrode interfaces should have a mechanical strength at least comparable to that of the alloy of which the element 72 is made. More specifically, the contact electrode 88 may be bonded to the element 72 by either the "direct casting" or "fusion" methods, more fully hereinafter described. The contact electrode, being chemically stable with respect to the element 72 provides the necessary means for connecting said element into its electrical circuit while at the same time chemically isolating said element from the other conductors making said circuit.

If the "direct casting" method is utilized, the iron of the electrode is preferably stabilized in the alpha phase by addition of one or more known alpha phase stabilizers in order to avoid shearing of the solid bond between the element and the electrode during cooling. A preferred stabilizer for this purpose is, however, molybdenum in amount of from 2.7% to 7% by weight of the iron. If the "fusion" method of contacting element 72 is utilized, the iron of the electrode may be stabilized in the gamma phase, alpha phase or unstabilized. Whether the "direct casting" or "fusion" method is utilized, it is important, however, that iron diffuse into the active element 72 during the contacting procedure in amount no more than 0.5% by weight of the element, lest the thermoelectric power and electrical resistivity of the element 72 be reduced more than 10%.

In the "direct casting" method, the contact electrode 88 is placed in one end of the cavity of a mold, preferably of graphite, and the selected aforedescribed alloy or composition, in chunk or granular form, is then placed in the mold in contiguous engagement with the iron electrode. The mold is then heated, preferably in a reducing atmosphere, to the melting point of the alloy, i.e., within the temperature range of 920° C. to 1100° C., for a short interval of time sufficient to produce limited alloying between the iron electrode and the semi-metallic alloy. The mold is then cooled, causing the molten semi-metallic alloy to solidify as an ingot to one end of which the iron electrode 88 is firmly bonded. The other end of the ingot may then be machined to provide the conical surface 86.

Alternatively, the element 72 may be preformed as an ingot which may then be bonded to the contact electrode 88 by the "fusion" method. In this method, the end of the ingot to be contacted is pressed against the surface of the contact electrode, and said electrode is then heated, preferably inductively, until a very thin layer of the ingot becomes molten and fuses with the surface of the electrode. Heating the iron of the contact electrode to a temperature of 730° C. to 905° C. permits migration of the iron into the semi-metallic element to form a thin layer of an alloy thereof having a melting point below the phase transformation temperature of the iron. Due to its thin section, the molten layer rapidly approaches the compositions which solidify at temperatures below the phase transformation temperatures of the iron, to form the bond. Accordingly, the time of heating is a matter of only a few seconds, after which the assembly is allowed to cool. As previously mentioned, in this method, the iron of the contact electrode need not be alpha stabilized, but may be unstabilized or even gamma-phase stabilized.

The subassembly comprising the element 72 with the contact electrode 88 bonded thereto is preferably annealed at from 540° C. to 680° C. for from 10 to 20 hours in an inert or reducing atmosphere to render the composition more homogeneous. After the annealing step, the subassembly together with sheath member 74 is fixed to mounting member 80.

Since, as is well known in the art, the electrical and thermal resistance of the thermoelectric generators are dependent upon the configuration thereof, as well as on the electrical and thermal conductivities of the elements 72 and 74, a relationship between the dimensions of each element can be obtained which affords the highest thermal conversion efficiency in such a mounting or assembly. In the embodiments described, the thermal conductivity of element 72 is low as compared with that of element 74 (for example, .02 w./cm./° C. as compared to .261 w./cm./° C.).

For elements of any given thermal and electrical conductivities, the conversion efficiency depends strongly upon the ratio of thickness of the sheath 74 to the radius of the element 72 or more specifically upon the cross-sectional area of the two. In the embodiment illustrated, this ratio is preferably about 6 to 1 or more.

It is understood, of course, that the conversion efficiency of the thermocouple is also dependent upon the difference between the hot and cold junction temperatures. For thermocouples utilizing a semi-metallic inner element, having a low thermal conductivity, high temperature differences can be achieved by selecting for the semi-metallic element a ratio of length to diameter, which in the exemplary embodiment hereindisclosed is about 4 to 1, such that radiation transfer of heat from the surface of the inner element to the sheath establishes substantial temperature gradients within the inner element, particularly near the hot junction. When this is done, the heat flow into the inner element through the hot junction, i.e., the juncture of the faces 84 and 86, is exhausted to the case over the entire side wall surface of the inner element allowing the inner cold junction, i.e., the juncture of the element 72 with the contact electrode 88, to assume a temperature only slightly greater than that of the outer cold junction, i.e., the juncture of the element 74 and terminal member 96. A further consequence of such radiative cooling is the reduced electrical resistance of the semi-metallic element 72, said element having a positive temperature coefficient of resistance.

The radiation responsible for the removal of the heat transmitted across the hot junction takes place between the element 72, its cold junction electrode 88, and the metal wall of element 74.

Thermoelement means 102 and 104 of the heat pump portion of structure 70 may be formed of any suitable material which exhibits a high Peltier coefficient, low thermal conductivity and low electrical resistivity. More specifically, elements 102 and 104 may be of the materials disclosed in the copending application of Robert W. Fritts and Sebastian Karrer, Serial No. 512,436, filed June 1, 1955, now Patent No. 2,896,005. Such materials are semi-metallic alloys or compositions which may be characterized as binary metallic compounds of slightly imperfect compositions, i.e., containing beneficial impurities constituting departures from perfect stoichiometry by reason of an excess of one of the metals over the other and/or containing added beneficial impurity substances denominated hereinafter "promoters." Such semi-metallic compositions have semi-conductor-like conductivity (both electrical and thermal, as aforementioned). Semi-metallic alloys or compositions also include mixtures of such binary metallic compounds, which may be denominated ternary metallic alloys or compositions. Certain of these alloys or compositions exhibit negative and certain exhibit positive electrical characteristics.

In order for thermoelement means 102 and 104 to be arranged in series and effect a change in the temperature therebetween, it is necessary that such elements be formed of materials which exhibit opposite thermoelectric characteristics. That is, current flow through a thermoelement which exhibits positive electrical characteristics causes heat to be pumped in the direction of current flow therethrough. Conversely, current flow through a thermoelement which exhibits negative electrical characteristics causes heat to be pumped in a direction opposite to the direction of current flow therethrough. Thus, with elements 102 and 104 arranged in series, it is necessary that one of such elements causes heat to be pumped in the direction of current flow therethrough while the other of such elements causes heat to be pumped in the direction opposite to current flow therethrough so that said elements will simultaneously pump heat to or away from electrode 88.

As will hereinafter be explained in greater detail during discussion of the operation of the disclosed device, the decision as to which of the thermoelements 102 and 104 should exhibit negative characteristics while the other exhibits positive characteristics is dependent upon the direction of current flow through such elements when it is desired to effect cooling of electrode 88, and the direction of current flow therethrough when it is desired to effect heating of said electrode.

A negative thermoelement means for use in a heat pump may, for example, be formed of an alloy comprising lead and at least one member of the group tellurium, selenium and sulphur as above described with reference to thermoelement means 72 of the generator portion of structure 70. However, although the ranges of the various elements of the composition or alloy for use as a thermoelectric element of a heat pump are substantially the same as the ranges for the corresponding elements of the same compositions or alloys for use as thermoelectric elements of a thermoelectric generator, they are by no means to be regarded as the same since the usefulness of a generator thermoelement depends upon entirely different characteristics than does the usefulness of a composition as a heat pump thermoelement. Thus, although the ranges of the various ingredients of the generator compositions and heat pump compositions may be similar or even identical, the most desirable or optimum compositions within such ranges will differ greatly in view of the different characteristics desired in generator elements and heat pump elements. A negative thermoelement for use in a heat pump could comprise lead-selenium-tellurium having a tellurium-selenium constituent in which the selenium is but a trace. In this case, such constituent should constitute from 35% to 38.05% by weight of the composition, the balance (61.95% to 65% by weight) being lead. At the other extreme, where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

Also, a negative thermoelemenet for use in heat pumps may also be formed of an alloy of lead, selenium and sulphur, as above explained with reference to the thermoelement for the generator portion of the structure 70 but wherein the optimum composition differs considerably from the optimum composition for use as a thermoelement in thermoelectric generators due to the desirability of obtaining certain characteristics which are merely of secondary importance in the construction of generator thermoelements. For example, a thermoelement of lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. Between these two extremes, the selenium-sulphur constituent varies linearly with the ratio of selenium to sulphur (expressed in atomic percent) in the selenium-sulphur constituent.

With regard to the aforementioned compositions for use as heat pump thermoelements, it will be observed that in each case there is an excess of lead over and above the amount thereof necessary for satisfying the stoichiometric proportions of the compound formed in the second constituent or constituents, i.e., the tellurium, selenium or sulphur. For example, a composition consisting substantially of lead and selenium can contain up to 10.4% lead by weight of the total composition over and above the 72.41% by weight lead stoichiometrically necessary for combination with selenium.

The electrical characteristics of the aforementioned semi-metallic alloys, desirable, for example, in thermoelements for heat pump applications can be markedly and advantageously altered in a reproducible manner by the addition thereto of controlled amounts of matter other than the constituents of the base composition. Such compositions may also be denominated "beneficial impurities" as distinguished from undesirable impurities. For convenience, these additions are hereinafter designated "promoters," since they tend to enhance the electrical characteristics desired for the particular application of the base compositions.

As has previously been observed, all of the aforedescribed base compositions exhibit negative Peltier E.M.F. and negative conductivity. By the addition of certain "promoters" such negative properties may be enhanced, while the polarity of the electrical properties of the base compositions may be reversed by the addition of certain other "promoters" to provide a semi-metallic composition having positive electrical characteristics, i.e., positive conductivity and Peltier E.M.F.

The aforementioned Patent No. 2,896,005 gives a complete description of the beneficial impurities, including both departures from perfect stoichiometry and "promoters," which have been found to be effective for improvement of the electrical properties of semi-metallic thermoelectric elements for heat pump applications when added to the aforementioned base compositions in minor amounts. For example, up to a maximum of 6.9% by weight of beneficial impurity including 3.9% excess lead and 3.0% promoter for promoted compounds and a maximum of 10.4% by weight of beneficial impurity for unpromoted compositions.

The proportions and ranges of the various constituents aforementioned and particularly the minimum limits of lead constituent in the compositions, must be regarded as critical if the composition is to have the electrical properties desired in thermoelectric heat pump elements. If the lead content is significantly less than the minimum amount indicated for any particular selenium-tellurium or selenium-sulphur proportion, the desired values of Peltier E.M.F. and resistivity will not be afforded and the significant electrical and mechanical properties will not be reproducible. On the other hand, if the lead content for any composition appreciably exceeds the aforementioned maximum limit, the resulting composition is too metallic in nature to afford satisfactory electrical characteristics for the purposes of the present invention.

Another positive thermoelement for use in heat pumps may also be formed of an alloy of lead and tellurium in which there is an excess of tellurium over and above the amount thereof necessary for satisfying the stoichiometric proportions of the compound lead-telluride. Such alloy or composition should consist entirely of lead and tellurium in which lead is present in the range of 58.05% to 61.8% by weight and the balance in the range of 42.0% to 38.2% by weight tellurium. It will be observed that in this case there is an excess of tellurium over and above the amount thereof necessary for satisfying the stoichiometric proportions.

As has been previously observed, the tellurium rich base lead-tellurium compositions exhibit positive Peltier E.M.F. and positive conductivity. The electrical characteristics of this compound, desirable, for example, in thermoelements for heat pump applications, can be markedly and advantageously altered in a reproducible manner by addition thereto of controlled amounts of matter other than the constituents of such base composition. Such matter may also be denominated "beneficial impurities" as distinguished from undesirable impurities. For convenience, the additions are hereinafter designated "promoters" since they tend to enhance the electrical characteristics desired for the particular application of the base compositions.

The aforementioned Patent No. 2,896,005 gives a complete description of the beneficial impurities, including both departures from perfect stoichiometry and "promoters," which have been found to be effective for improvement of the electrical properties of semi-metallic thermoelectric elements for heat pump applications when added to the aforementioned tellurium rich base lead-tellurium compositions. For example, up to a maximum of 5.5% by weight of beneficial impurity including 4.9% excess tellurium and 0.60% promoter for promoted compounds and a maximum of 6.7% by weight of beneficial impurity for unpromoted compositions.

The proportions and ranges of the various constituents aforementioned and particularly the minimum limits of tellurium in the base composition, must be regarded as critical if the composition is to have the electrical properties desired in thermoelectric heat pump elements. If the tellurium content is significantly less than the minimum amount indicated, the desired values of Peltier E.M.F. and resistivity will not be afforded and the significant electrical and mechanical properties will not be reproducible. On the other hand, if the tellurium content appreciably exceeds the aforementioned maximum limits, the resulting composition will not afford satisfactory electrical characteristics for the purposes of the present invention.

The operation of the novel apparatus shown in the drawing will now be described:

In order to afford regulation and control of the temperature of the air within enclosure 10 at a temperature greater than ambient, it is first necessary to manually operate switch 110 so as to effect electrical engagement of contactors 112, 114, 116 and 118 with stationary contacts 124, 128, 132 and 136 respectively. Also, it is necessary to move contactor 56 of switch 48 into engagement with stationary contact 50. For reasons of convenience, switches 110 and 48 may be ganged so that only a single manual operation is necessary to set up either the heating or cooling operation, as will become more apparent as the discussion proceeds. Such operation of switch 110 causes alternating current to be impressed across rectifier bridge circuit 150 through a first circuit consisting of lead wire 172, contactor 118, and lead wire 166, and a second circuit consisting of lead wire 160 and current limiting resistor 162. Such application of an alternating current potential to bridge circuit 150 causes direct current to flow through the heat pump portion of structure 70 by virtue of the circuit comprising lead wire 148, contactor 116, lead wire 144, heat transfer member 108, thermoelement 104, stem portion 90 of electrode 88, theremoelement 102, heat transfer member 106, lead wire 142, contactor 114 and lead wire 146.

Since contactor 56 of switch 48 is positioned to afford operation of heating means 16, it is desirable to have the above-mentioned current flow through the heat pump portion of structure 70, namely, from heat transfer member 108 to heat transfer member 106, effect heating of stem 90 and contact electrode 88 and hence heating of the generator cold junctions between element 72 and electrode 88 and between element 74 and terminal member 96. It is thus necessary that thermoelement 104 exhibit positive thermoelectric characteristics so that the aforementioned current flow causes heat to be absorbed by the fins 108a of member 108 and pumped with the current flow through member 104 to stem 90 and contact electrode 88. Also, thermoelement 102 must exhibit negative thermoelectric characteristics so that such current flow causes heat to be absorbed by the fins 106a of member 106 and pumped to stem 90 and electrode 88 through element 102.

In this manner, the temperature of the cold junctions of the thermoelectric generator portion of structure 70 becomes appreciably higher than the temperature of hot junction 78. Such temperature differential causes current to flow through winding 64 of electro-responsive switch 62 by virtue of a circuit including lead wires 98 and 100. Since winding 64 of switch 62 is responsive to a predetermined minimum value of energization to effect magnetic attraction of contactor 160 into engagement with stationary contact 66, whenever the temperature differential between the hot and cold junctions of the thermoelectric generator is above a predetermined minimum differential, electroresponsive valve 26 of temperature varying means 16 is energized. Such energization of valve 26 takes place through the circuit comprising lead wire 68, contactor 60, lead wire 58, contactor 56, lead wire 52, valve 26, and lead wires 54 and 42. In this event, the heated fluid is permitted to flow from boiler 20 to heating coils 24; the heated air within air duct 14 and about heating coils 24 being pushed or blown into enclosure 10 by means of electroresponsive fan means 28. Such heated air within enclosure 10 increases the temperature of the hot junction 78 of the thermoelectric generator thereby decreasing the temperature differential between the hot and cold junctions thereof.

Such operation continues with heating means 16 and fan means 28 supplying heated air to enclosure 10 for increasing the temperature therewithin. However, the temperature of the hot junction 78 of the thermoelectric generator eventually reaches a point where the temperature differential between the hot and cold junctions is insufficint to afford energization of winding 64 above the aforementioned predetermined minimum level of energization. When this occurs, contactor 60 of switch 62 is permitted to return to its disengaged position with respect to stationary contact 66 whereupon electroresponsive valve 26 is immediately deenergized and prevents further circulation of the heated fluid within boiler 20. Under these conditions, further heating of enclosure 10 is prevented.

Upon cooling of the air within encloure 10 and hence cooling of the hot junction 78 of the thermoelectric generator, energization of winding 64 is increased until the hot junction temperature has decreased sufficiently to afford energization of winding 64 above the aforementioned predetermined minimum level of energization. In this event, heating of enclosure 10 again takes place as above explained.

Referring to the drawings, it will be noted that the aforementioned initial operation of switch 110 also placed thermistor 176 across the source of power in parallel circuit arrangement with bridge circuit 150 by virtue of the circuit comprising lead wire 177, thermistor 176, lead wire 174, contactor 112, lead wires 164 and 160, and current limiting resistor 162. It is intended that the thermistor 176 be placed outdoors for control of the temperature within enclosure 10 in accordance with variations in outdoor temperature. That is, as the temperature outdoors and about thermistor 176 decreases, the electrical resistance of thermistor 176 increases so that greater current flow is effected through thermoelements 104 and 102 of the aforedescribed heat pump. Such increase in current flow through the heat pump increases the temperature to be maintained within enclosure 10 thus affording compensation for the increased heat losses coincidental with a decrease in outdoor temperature.

Should it be desired to control the temperature of the air within enclosure 10 at a temperature less than ambient temperature, it is necessary to move contactor 56 of manually operable switch 48 out of engagement with stationary contact 50 and into engagement with stationary contact 46. Also, it is necessary to operate switch 110 so as to effect disengagement of contactors 112, 114, 116 and 118 with stationary contacts 124, 128, 132 and 136, respectively, and to effect engagement of such contactors with stationary contacts 122, 126, 130 and 134, respectively. Such operation of switch 48 disconnects heating means 16 while placing cooling means 18 in circuit. Such operation of switch 110 causes an alternating current electrical potential to be impressed across bridging circuit 150 through a first circuit comprising lead wire 172, contactor 118, lead wire 168, thermistor 170 and lead wire 166, and a second circuit comprising lead wire 160 and adjustable current limiting resistor 162.

The direct current electrical energy thus afforded by rectifier bridge circuit 150 flows through the heat pump portion of structure 70 through lead wire 148, conducting means 138, contactor 114, lead wire 142, heat transfer member 106, thermoelement 102, stem portion 90 of electrode 88, thermoelement 104, heat transfer member 108, lead wire 144, contactor 116, conducting means 140 and lead wire 146. Such current flows through the heat pump from member 106 to member 108, thereby causing negative thermoelement 102 to pump heat from electrode 88 to member 106 for dissipation to the surrounding atmosphere by fins 106a. Such current also flows through the positive thermoelement 104 causing heat to be absorbed from electrode 88 and pumped to member 108 where it is dissipated to the atmosphere by fins 108a.

In this manner, the temperature of the cold junctions of the thermoelectric generator is decreased below the temperature of the hot junction 78 until a predetermined temperature differential is effected wherein sufficient energization is afforded winding 64 of switch 62 to cause contactor 60 to be attracted into engagement with stationary contact 66. Under these conditions, compressor 38 of cooling means 18 is energized through a circuit comprising lead wire 68, contactor 60, lead wire 58, contactor 56, lead wire 44, compressor 38 and lead wire 42. Energization of compressor 38 causes the liquid refrigerant within conduit 30 to be circulated through the heat exchanger portion 32 and evaporator portion 34, such liquid refrigerant undergoing expansion by means of valve 36 to effect cooling of the air within air duct 14 and about evaporator portion 34. Such cooled air is then pumped or pushed into enclosure 10 by fan means 28.

In this manner, the temperature of the air within enclosure 10 and hence the temperature of the hot junction 78 of the thermoelectric generator is decreased until the temperature differential between the hot and cold junctions is insufficient to cause winding 64 to retain contactor 60 in engagement with stationary contact 66. In this event, energization of compressor 38 and further cooling of the air within duct 14 is immediately terminated. As the air within enclosure 10 continues to vary, cooling means 18 is cycled accordingly so as to maintain the temperature within enclosure 10 at a substantially constant cool temperature.

As above explained with reference to thermistor 176, thermistor 170 is placed outdoors, but since it is in series circuit arrangement with bridge circuit 150, an increase in outdoor temperature causes an increase in current flow through the heat pump by virtue of a corresponding decrease in the electrical resistance of thermistor 170. Such increase in current flow through the heat pump effects further cooling of the cold junctions of the thermoelectric generator wherefore the temperature to be maintained within enclosure 10 is correspondingly decreased.

The temperature to be maintained within enclosure 10 for any given outdoor temperature may be varied by suitable adjustment of current limiting resistor 162 so as to vary the amount of current permitted to flow through rectifier bridge circuit 150 and to the heat pump.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A unitary thermoelectric generator-thermoelectric heat pump assembly comprising first and second dissimilar thermoelements joined at a first thermojunction to form a thermoelectric generator having at least one second thermojunction, contact means for at least one of said thermojunctions, mounting means of insulating material on which said generator is mounted, third and fourth dissimilar thermoelements mounted on said insulating mounting member and joined at one end to said contact means to form a third thermojunction, said third and fourth thermoelements forming a thermoelectric heat pump having thermojunction and heat transfer means for the ends of said third and fourth thermoelements opposite those joined to said contact means.

2. A unitary thermoelectric generator-thermoelectric heat pump assembly comprising a thermoelectric generator having first and second dissimilar concentric thermoelements joined at one end to form a first thermojunction, a mounting member of insulating material formed with a recess in which the other ends of said thermoelements are fixed, contact means forming a thermojunction with said other end of one of said thermoelements, third and fourth dissimilar thermoelements embedded within said mounting member and joined at one end to said contact means to form a third thermojunction, said third and fourth thermoelements forming a thermoelectric heat pump, and externally exposed contact and heat transfer members forming thermojunctions with the other ends of said third and fourth thermoelements.

3. A unitary thermoelectric generator-heat pump assembly comprising mounting means of insulating material, a thermoelectric generator mounted on said mounting means and having thermoelement means and sensing and reference junction means, said reference junction means including a thermoelement contact member, and a thermoelectric heat pump mounted on said mounting means and having thermojunction means, said contact member and said thermojunction means being physically joined, wherefore said generator reference junction means and said heat pump thermojunction means are in heat transfer relation.

4. In combination, a pair of dissimilar thermoelements joined to form a thermoelectric generator having a sensing junction, contact means forming a reference junction with one of said thermoelements, a thermoelectric heat pump having contact means forming a thermojunction, the contact means of said reference junction and of said heat pump being physically joined, wherefore said generator reference junction and said heat pump thermojunction means are in good heat transfer relation.

5. A unitary thermoelectric generator-heat pump assembly comprising mounting means of insulating material, a thermoelectric generator mounted on said mounting means and having sensing and reference junction means, and a thermoelectric heat pump having thermojunction means and mounted on said mounting means with said thermojunction means juxtaposed to and in good heat transfer relation with said generator reference junction means.

6. In combination, a thermoelectric generator having sensing and reference junction means, a thermoelectric heat pump having thermojunction means, and mounting means physically connecting said generator and heat pump together as a unitary assemblage, with said heat pump thermojunction means juxtaposed to and in good heat transfer relation with said generator reference junction means.

References Cited in the file of this patent
UNITED STATES PATENTS

| | | |
|---|---|---|
| 1,685,995 | Gano | Oct. 2, 1928 |
| 1,982,053 | Hodgson | Nov. 27, 1934 |
| 2,068,283 | Stuart | Jan. 19, 1937 |
| 2,137,833 | Crago | Nov. 22, 1938 |
| 2,188,877 | Kriechbaum | Jan. 30, 1940 |
| 2,720,615 | Betz | Oct. 11, 1955 |
| 2,766,937 | Snavely | Oct. 16, 1956 |

OTHER REFERENCES

Some Experiments With Peltier Effect, Electrical Engineering, pages 589–591, July 1951.